US009182933B2

(12) United States Patent
Nanjo

(10) Patent No.: US 9,182,933 B2
(45) Date of Patent: Nov. 10, 2015

(54) IMAGE FORMING APPARATUS USING VIBRATION DETECTION TO RECOGNIZE MOBILE TERMINAL

(71) Applicant: KYOCERA Document Solutions Inc., Osaka-shi, Osaka (JP)

(72) Inventor: Yuzuru Nanjo, Osaka (JP)

(73) Assignee: KYOCERA DOCUMENT SOLUTIONS INC., Osaka-shi, Osaka (JP)

(*) Notice: Subject to any disclaimer, the term of this patent is extended or adjusted under 35 U.S.C. 154(b) by 0 days.

(21) Appl. No.: 14/602,302

(22) Filed: Jan. 22, 2015

(65) Prior Publication Data
US 2015/0212780 A1   Jul. 30, 2015

(30) Foreign Application Priority Data
Jan. 30, 2014 (JP) ................................ 2014-015773

(51) Int. Cl.
*G06F 3/12* (2006.01)
(52) U.S. Cl.
CPC ............ *G06F 3/1292* (2013.01); *G06F 3/1203* (2013.01); *G06F 3/1236* (2013.01)
(58) Field of Classification Search
None
See application file for complete search history.

(56) References Cited

U.S. PATENT DOCUMENTS

| | | | |
|---|---|---|---|
| 8,885,196 B2* | 11/2014 | Tsuji ..................... | G06F 3/1204 358/1.1 |
| 9,064,209 B2* | 6/2015 | Fallon .................. | G06F 21/608 |
| 2007/0220255 A1* | 9/2007 | Igarashi ............... | G06F 21/608 713/170 |
| 2012/0188178 A1* | 7/2012 | Hamada ............... | G06F 3/0436 345/173 |

FOREIGN PATENT DOCUMENTS

| | | |
|---|---|---|
| JP | 2003259466 A | 9/2003 |
| JP | 2005045308 A | 2/2005 |

* cited by examiner

*Primary Examiner* — Paul F Payer

(57) ABSTRACT

An image forming apparatus has an operation panel and is operable from an operation panel and a mobile terminal. The image forming apparatus includes a holding unit, a vibration detecting unit, a communication unit, and a terminal recognition unit. The holding unit holds the mobile terminal. The vibration detecting unit detects a vibration of the mobile terminal held by the holding unit. The communication unit receives operation information wirelessly from the mobile terminal. The terminal recognition unit recognizes the mobile terminal from which an operation is to be accepted, on the condition that the timing of reception of the operation information by the communication unit coincides with the timing of detection of the vibration by the vibration detecting unit. The image forming apparatus disables acceptance of an operation from the operation panel in the case of accepting an operation from the mobile terminal.

7 Claims, 9 Drawing Sheets

IMAGE FORMING APPARATUS USING VIBRATION DETECTION TO RECOGNIZE MOBILE TERMINAL

INCORPORATION BY REFERENCE

The disclosure of Japanese Patent Application No. 2014-15773 filed on Jan. 30, 2014 including the specification, drawings and abstract is incorporated herein by reference in its entirety.

BACKGROUND

This disclosure relates to an image forming apparatus the operation of which is also controllable on the basis of an operating instruction from a mobile terminal.

Techniques which allow image forming apparatuses to be operated by mobile terminals have recently been proposed. For example, a technique of wirelessly operating an image forming apparatus using a mobile terminal owned by a user has been proposed. A technique of automatically selecting an electronic device to be operated has also been proposed. With this technique, field intensities of a plurality of electronic devices are measured by a remote controller, and the one of those having the strongest field intensity, i.e. the electronic device located closest to the remote controller, is selected as the electronic device to be operated.

SUMMARY

In an aspect of the present disclosure, an image forming apparatus has an operation panel and is operable from the operation panel and a mobile terminal. The image forming apparatus includes a holding unit, a vibration detecting unit, a communication unit, and a terminal recognition unit. The holding unit holds the mobile terminal. The vibration detecting unit detects a vibration of the mobile terminal held by the holding unit. The communication unit receives operation information wirelessly from the mobile terminal. The terminal recognition unit recognizes the mobile terminal from which an operation is to be accepted, on the condition that the timing of reception of the operation information by the communication unit coincides with the timing of detection of the vibration by the vibration detecting unit. The image forming apparatus disables acceptance of an operation from the operation panel in the case of accepting an operation from the mobile terminal.

DETAILED DESCRIPTION

Figure 1:
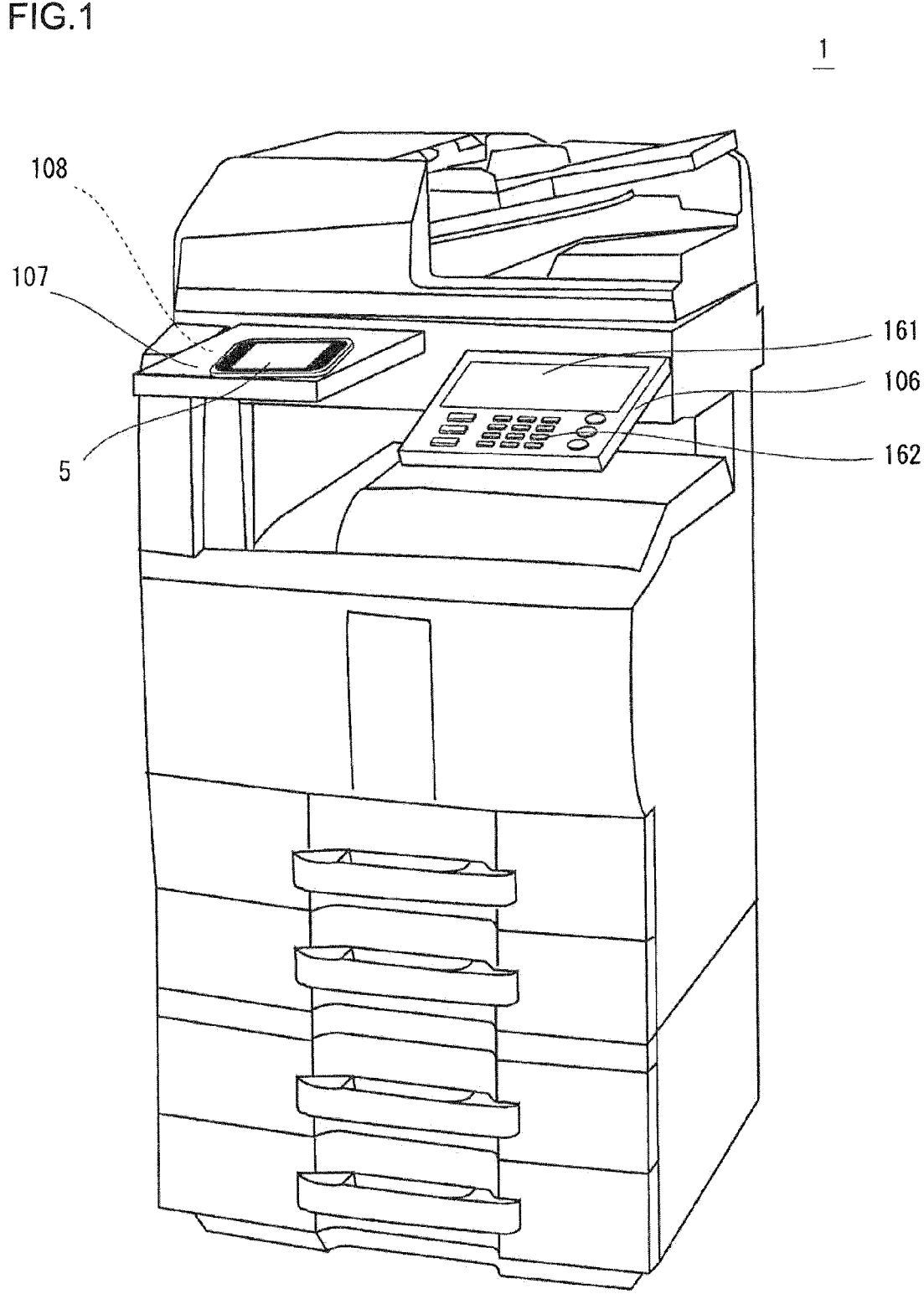
FIG. 1 is a perspective view of an image forming apparatus according to an embodiment of the present disclosure.

Referring to FIG. 1, an image forming apparatus 1 according to an embodiment of the present disclosure has an operation panel 106 and a holding unit 107 for holding a mobile terminal 5, which are arranged on the front side of the image forming apparatus 1. The image forming apparatus 1 is configured to be operable from the operation panel 106 as well as from the mobile terminal 5 held by the holding unit 107.

The operation panel 106 is provided with a display unit 161 and operation buttons 162. A user may use the operation panel 106 to input instructions to thereby perform various settings on the image forming apparatus 1 and cause the apparatus to carry out various functions including image forming. The display unit 161 is capable of indicating the statuses of the image forming apparatus 1 and displaying the image forming conditions and the number of printed copies. The display unit 161 also serves as a touch panel to allow the user to perform settings for double-face printing, black/white inversion, and other functions, and also perform scaling setting, density setting, and other settings. The operation buttons 162 include a start button for a user to instruct to start image forming, a stop/clear button used for example to stop the image forming, a reset button used to return various settings of the image forming apparatus 1 to default settings, and a numeric keypad.

The holding unit 107 is a plate-like table on which a mobile terminal 5 is placed. The holding unit 107 protrudes frontward from the image forming apparatus 1. The holding unit 107 is provided with a vibration detecting unit 108 which detects vibrations. The vibration detecting unit 108 is made up of an acceleration sensor or the like, and detects vibrations of the mobile terminal 5 placed on the holding unit 107. More specifically, when a user touches a button of the mobile terminal 5 or performs another operation on the mobile terminal 5 placed on the holding unit 107, a vibration (impact) caused by the operation is transmitted via the mobile terminal 5 to the holding unit 107, and the vibration of the holding unit 107 is detected by the vibration detecting unit 108. While the holding unit 107 is a table in the present embodiment, it only needs to be able to hold a mobile terminal 5. For example, the holding unit 107 may use a clip or the like to securely hold a mobile terminal 5.

Figure 2:
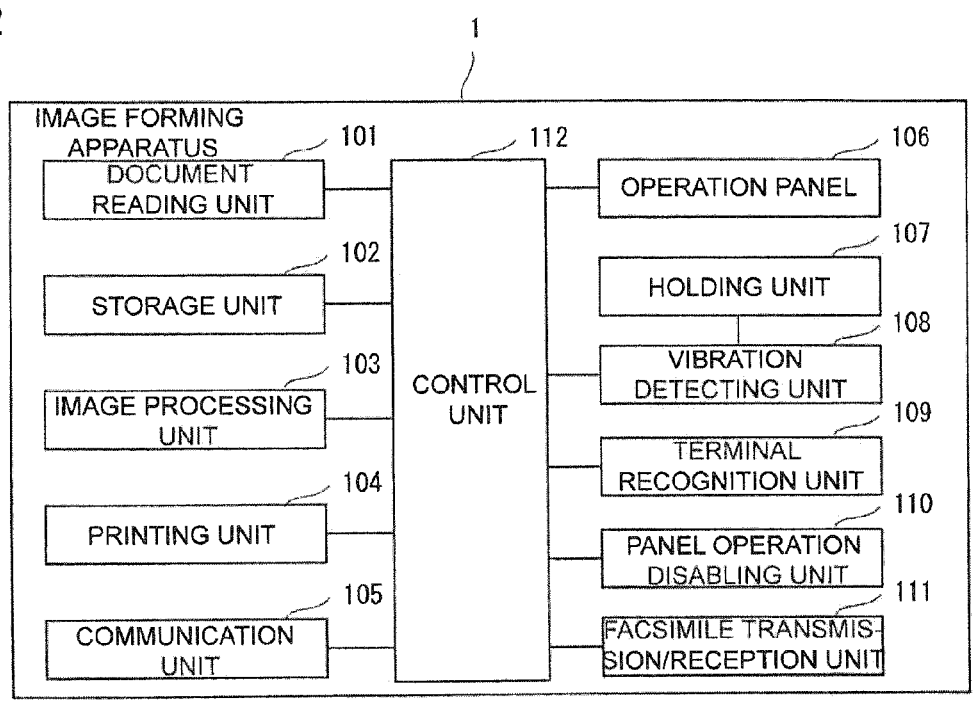
FIG. 2 is a block diagram showing the configuration of the image forming apparatus shown in FIG. 1.

Referring to FIG. 2, the operation panel 106 and the vibration detecting unit 108 of the image forming apparatus 1 are connected to a control unit 112, which controls the operations of the operation panel 106 and the vibration detecting unit 108. Also connected to the control unit 112 are: a document reading unit 101, a storage unit 102, an image processing unit 103, a printing unit 104, a communication unit 105, a terminal recognition unit 109, a panel operation disabling unit 110, and a facsimile transmission/reception unit 111.

The document reading unit 101 is a scanner which irradiates a document, fed by a document feeder (not shown) or placed on a platen glass by a user, with light, and receives the reflected light or the like to read the document image.

The storage unit 102 is a storage unit such as a semiconductor memory or a hard disk drive (HDD), in which image data read by the document reading unit 101 and/or image data received by the communication unit 105 are accumulated.

The image processing unit 103 is a unit which performs prescribed image processing on image data. The image processing unit 103 performs, for example, scaling processing and image enhancement processing including density adjustment and gradation adjustment.

The printing unit 104 is a printing unit which prints the image data stored in the storage unit 102. For example, the printing unit 104 forms a latent image on the surface of a photoconductive drum on the basis of the image data read from the storage unit 102, and uses toner to form a toner image from the latent image. The printing unit 104 then transfers the toner image from the photoconductive drum to recording paper, and fixes the toner image on the recording paper before ejecting the paper.

The communication unit 105 has the function of transmitting and receiving various data to and from a mobile terminal 5 via a wireless network. The communication unit 105 may be connected to the wireless network via an access point connected to a wired network. The communication unit 105 may have the function of transmitting and receiving various data to and from a computer terminal via a wired network; for example, the unit may receive a print job from the computer terminal.

The terminal recognition unit 109 performs processing of recognizing the mobile terminal 5 from which an operation is to be accepted. More specifically, in the case where the timing when operation information was received from a mobile terminal 5 via the communication unit 105 coincides with the timing when a vibration of the holding unit 107 was detected via the vibration detecting unit 108, the terminal recognition unit 109 recognizes the mobile terminal 5 from which the operation information has been received, as the mobile terminal 5 from which an operation is to be accepted.

The panel operation disabling unit 110 has the function of disabling the operation panel 106 when the terminal recognition unit 109 recognizes the mobile terminal 5 from which an operation is to be accepted, so as not to accept an operation from the operation panel 106. The panel operation disabling unit 110 also has the function of canceling the disablement. For example, the panel operation disabling unit 110 may perform control such that no operation key will be displayed on the operation panel 106, or such that any operating instruction input from the operation panel 106 will be ignored.

The facsimile transmission/reception unit 111 has a modem. The facsimile transmission/reception unit 111 has the facsimile transmitting function of generating facsimile signals from the image data read by the document reading unit 101 or stored in the storage unit 102 and transmitting the generated facsimile signals via a public line network, and also has the facsimile receiving function of receiving facsimile signals via a public line network.

The control unit 112 is an information processing unit such as a microcomputer which includes a read only memory (ROM), a random access memory (RAM), etc. The ROM stores a control program for controlling the operations of the image forming apparatus 1. The control unit 112 reads the control program stored in the ROM and deploys it on the RAM, to perform overall operation control of the apparatus in accordance with prescribed instruction information input from the operation panel 106 as well as instruction information transmitted from the mobile terminal 5 that has been recognized by the terminal recognition unit 109.

Figure 3:
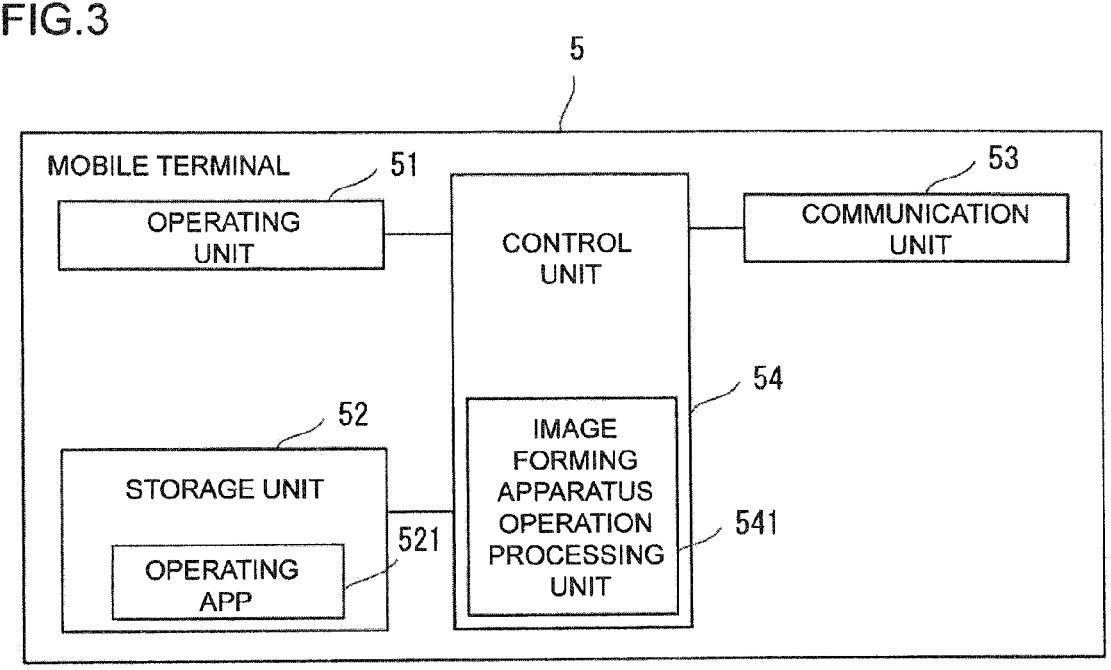
FIG. 3 is a block diagram showing the configuration of the mobile terminal shown in FIG. 1.

Next, the configuration of a mobile terminal 5 will be described with reference to FIG. 3. The mobile terminal 5 is, for example, a smartphone, a cell phone, a tablet terminal, a notebook PC, or a personal digital assistant (PDA). The mobile terminal 5 includes an operation unit 51, a storage unit 52, a communication unit 53, and a control unit 54.

The operation unit 51 is a user interface which includes a touch panel and various operation keys. The touch panel has a transparent pressure sensor disposed on a surface of a liquid crystal display panel, and serves as a display unit and an input unit.

The storage unit 52 is a storage unit such as a semiconductor memory or a HDD, and stores an operating APP 521. The operating APP 521 is an application program, which has been installed in the mobile terminal 5, for enabling the mobile terminal 5 to operate the image forming apparatus 1. The operating APP 521 is configured such that it can be downloaded and installed into the mobile terminal 5 from the Internet network or the like via the communication unit 53.

The communication unit 53 has the function of transmitting and receiving various data to and from the image forming apparatus 1 via a wireless network.

The control unit 54 is connected to the operation unit 51, the communication unit 53, and the storage unit 52, and performs overall operation control of the mobile terminal 5 in accordance with prescribed instruction information input from the operation unit 51. The control unit 54 is an information processing unit such as a microcomputer which includes a ROM, a RAM, etc. The ROM stores a control program for controlling the operations of the mobile terminal 5. The control unit 54 reads the control program stored in the ROM and deploys it on the RAM, for overall control of the terminal in accordance with prescribed instruction information input from the operation unit 51.

When the control unit 54 detects an operation of starting the operating APP 521 via the operation unit 51, the control unit 54 reads the operating APP 521 stored in the storage unit 52 and deploys it on the RAM, to thereby start the operating APP 521. This causes the control unit 54 to function as an image forming apparatus operation processing unit 541 which implements the function of the operating APP 521. The image forming apparatus operation processing unit 541 is capable of operating the printing function, copying function, facsimile function, scanning function, and other functions in the image forming apparatus 1.

Figure 4:
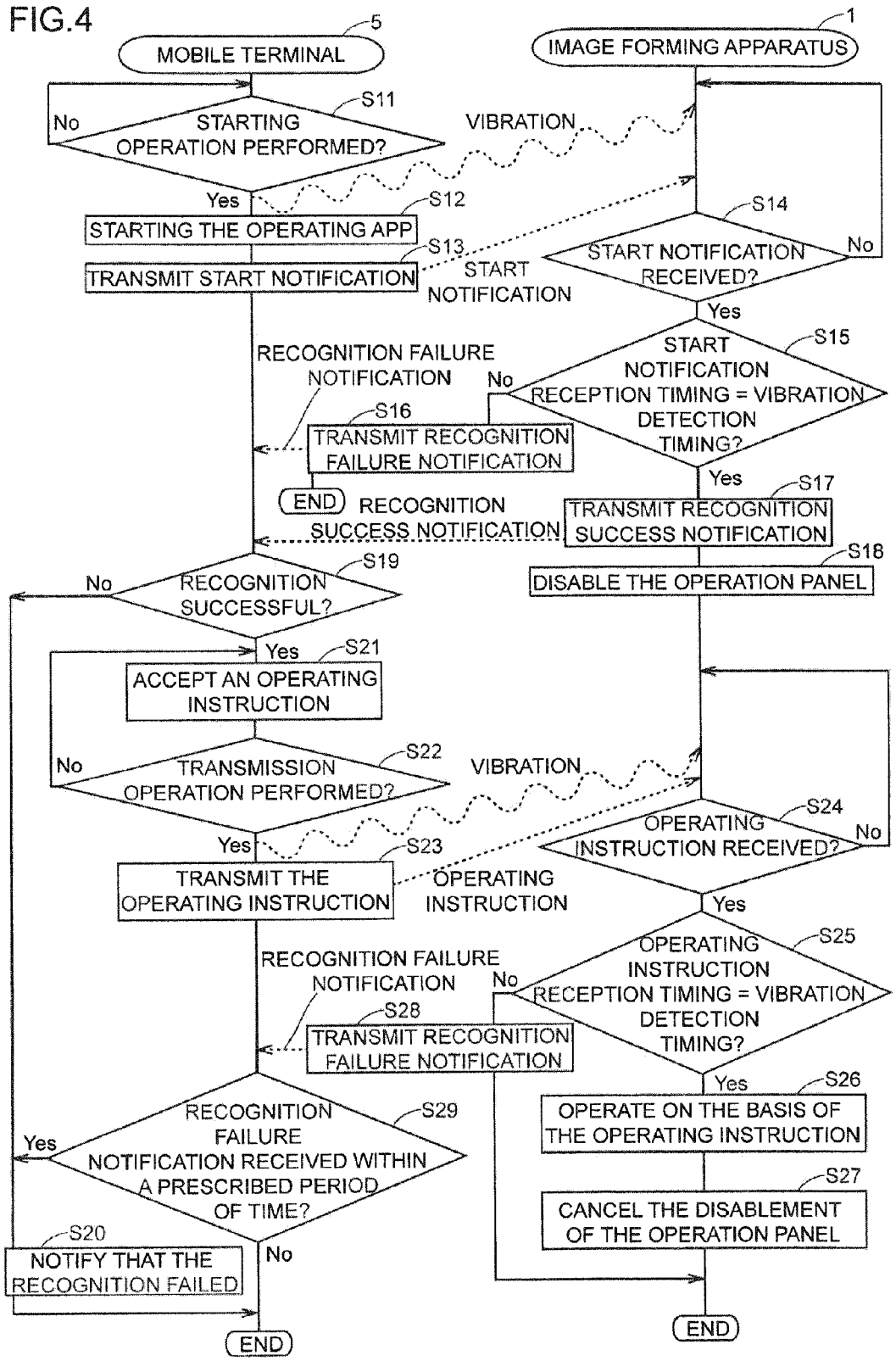
FIG. 4 is a flowchart illustrating the flow of the process performed by the image forming apparatus shown in FIG. 1.

With the image forming apparatus 1 and the mobile terminal 5 configured as described above, the flow of the process in which the image forming apparatus 1 accepts an operation from the mobile terminal 5 will now be described with reference to FIG. 4. It should be noted that the vibration detecting unit 108 constantly detects vibrations of the holding unit 107. Further, it is assumed that the mobile terminal 5 stores in advance the address information (for example, IP address) of any image forming apparatus 1 with which the mobile terminal 5 is connectable wirelessly.

First, the control unit 54 of the mobile terminal 5 determines whether an operation of starting the operating APP 521 has been performed via the operation unit 51 (step S11). If the operation of starting the operating APP 521 has not been performed (No in step S11), the process returns to step S11. Once the operation of starting the operating APP 521 is performed (Yes in step S11), the control unit 54 starts the operating APP 521 (step S12). As such, the operating APP 521 is read from the storage unit 52 and deployed on the RAM by the control unit 54, allowing the control unit 54 to function as the image forming apparatus operation processing unit 541. Further, as the user operates the mobile terminal 5 placed on the holding unit 107, the vibration (impact) caused by the starting operation is transmitted via the mobile terminal 5 to the holding unit 107, and is detected by the vibration detecting unit 108. Subsequently, the image forming apparatus operation processing unit 541 transmits a start notification, indicating that the operating APP 521 has been started, to the image forming apparatus 1 via the communication unit 53

(step S13). The start notification is transmitted to the image forming apparatus 1 via the communication unit 53 through a wireless network.

On the other hand, the terminal recognition unit 109 of the image forming apparatus 1 waits until a start notification is received via the communication unit 105 (step S14). If no start notification is received (No in step S14), the process returns to step S14. Once the start notification is received (Yes in step S14), the terminal recognition unit 109 determines whether the timing of reception of the start notification coincides with the timing of detection of a vibration of the holding unit 107 by the vibration detecting unit 108 (step S15). It has been configured such that the timing when the communication unit 105 receives a start notification and the timing when the vibration detecting unit 108 detects the vibration of the holding unit 107 caused by the operation of starting the operating APP 521 in the mobile terminal 5 coincide with each other in the case where the operation of starting the operating APP 521 is performed in the state where the mobile terminal 5 is placed on the holding unit 107. For example, it may be configured such that the terminal recognition unit 109 determines that the timing of reception of the start notification and the timing of detection of the vibration coincide with each other in the case where the vibration of the holding unit 107 has been detected via the vibration detecting unit 108 within a prescribed time period around the time when the start notification was received via the communication unit 105.

If the timing of reception of the start notification does not coincide with the timing of detection of the vibration of the holding unit 107 by the vibration detecting unit 108 (No in step S15), the control unit 112 transmits a recognition failure notification to the mobile terminal 5 via the communication unit 105 (step S16), and the process is terminated. On the other hand, if the timing of reception of the start notification coincides with the timing of detection of the vibration of the holding unit 107 by the vibration detecting unit 108 (Yes in step S15), the terminal recognition unit 109 recognizes the mobile terminal 5 from which the start notification was received, as the mobile terminal 5 from which an operation is to be accepted. Then, the control unit 112 transmits a recognition success notification to the mobile terminal 5 via the communication unit 105 (step S17), and causes the panel operation disabling unit 110 to disable the operation panel 106 (step S18).

After transmitting the start notification, the image forming apparatus operation processing unit 541 of the mobile terminal 5 determines whether the recognition was successful (step S19). If the recognition failed (No in step S19), the image forming apparatus operation processing unit 541 notifies the user that the recognition failed (step S20), and the process is terminated. On the other hand, if the recognition was successful (Yes in step S19), the image forming apparatus operation processing unit 541 accepts an operating instruction for the image forming apparatus 1 from the user (step S21).

Subsequently, the image forming apparatus operation processing unit 541 determines whether a transmission operation has been performed (step S22). If not (No in step S22), the process returns to step S21. Once the transmission operation is performed (Yes in step S22), the image forming apparatus operation processing unit 541 transmits the operating instruction to the image forming apparatus 1 via the communication unit 53 through a wireless network (step S23). As the user operates the mobile terminal 5 in the state where it is placed on the holding unit 107, the vibration (impact) caused by the transmission operation is transmitted via the mobile terminal 5 to the holding unit 107, and is detected by the vibration detecting unit 108.

When the operation panel 106 is disabled, the terminal recognition unit 109 of the image forming apparatus 1 waits until an operating instruction is received from a mobile terminal 5 (step S24). If no operating instruction is received (No in step S24), the process returns to step S24. It should be noted that when no operating instruction is received from a mobile terminal 5 within a prescribed period of time from when the operation panel 106 was disabled, the control unit 112 may cancel the disablement of the operation panel 106 via the panel operation disabling unit 110 and terminate the process.

On the other hand, if an operating instruction is received (Yes in step S24), the terminal recognition unit 109 determines whether the timing of reception of the operating instruction and the timing of detection of the vibration of the holding unit 107 by the vibration detecting unit 108 coincide with each other (step S25). It has been configured such that the timing when the communication unit 105 receives an operating instruction and the timing when the vibration detecting unit 108 detects the vibration of the holding unit 107 caused by the operation of transmitting the operating instruction in the mobile terminal 5 coincide with each other in the case where the transmission operation is performed in the state where the mobile terminal 5 is placed on the holding unit 107.

If the timing of reception of the operating instruction does not coincide with the timing of detection of the vibration of the holding unit 107 by the vibration detecting unit 108 (No in step S25), the terminal recognition unit 109 does not recognize the mobile terminal 5 from which the operating instruction was received as the mobile terminal 5 from which an operation is to be accepted. The control unit 112 transmits a recognition failure notification to the mobile terminal 5 via the communication unit 105 (step S28), and the process is terminated. On the other hand, if the timing of reception of the operating instruction coincides with the timing of detection of the vibration of the holding unit 107 by the vibration detecting unit 108 (Yes in step S25), the terminal recognition unit 109 recognizes the mobile terminal 5 from which the operating instruction was received as the mobile terminal 5 from which an operation is to be accepted, and the control unit 112 operates on the basis of the received operating instruction (step S26). Subsequently, the control unit 112 cancels the disablement of the operation panel 106 via the panel operation disabling unit 110 (step S27), and the process is terminated.

After transmitting the operating instruction, the image forming apparatus operation processing unit 541 of the mobile terminal 5 determines whether a recognition failure notification has been received within a prescribed period of time (step S29). If no recognition failure notification has been received (No in step S29), the process is terminated. In this case, the mobile terminal 5 placed on the holding unit 107 has been operated by a user and the image forming apparatus 1 operates on the basis of the operating instruction from the mobile terminal 5, so the user knows that the mobile terminal 5 has been recognized normally. On the other hand, if a recognition failure notification has been received (Yes in step S29), the image forming apparatus operation processing unit 541 notifies the user that the recognition failed (step S20), and the process is terminated.

As described above, in the present embodiment, when a user performs an operation on the operating APP 521 with the mobile terminal 5 being placed on the holding unit 107, the operation information (start notification, operating instruction) via the operating APP 521 is transmitted from the mobile terminal 5 to the image forming apparatus 1 through a wireless network. At the same time, the vibration caused by the user operation is transmitted via the mobile terminal 5 to the holding unit 107, and the vibration of the holding unit 107 is detected by the vibration detecting unit 108. In the case where the reception timing of the operation information, received from the mobile terminal 5, coincides with the detection timing of the vibration of the holding unit 107, detected by the vibration detecting unit 108, then the terminal recognition unit 109 of the image forming apparatus 1 recognizes the mobile terminal 5 from which the operating instruction was received as the mobile terminal 5 from which an operation is to be accepted, and the control unit 112 disables the operation panel 106 via the panel operation disabling unit 110. The control unit 112 then operates on the basis of the operating instruction from the mobile terminal 5 that has been recognized by the terminal recognition unit 109. As such, according to the present embodiment, the image forming apparatus 1 disables the operation panel 106 by the panel operation disabling unit 110 in the case of accepting operations from the mobile terminal 5. This can prevent a malfunction that would otherwise occur when an object is placed on the operation panel 106 or the user's hand touches the operation panel 106. Further, by accepting only the operations from the mobile terminal 5 placed on the holding unit 107, it is possible to clarify the mobile terminal 5 from which the image forming apparatus 1 is accepting operating instructions, and also make it clear, even from a distance, that the image forming apparatus 1 is in use.

The present disclosure is not limited to the above embodiment; various modifications are possible within the scope not departing from the spirit of the present disclosure.

For example, in the process described above, when the image forming apparatus 1 finishes operating on the basis of the operating instruction from the recognized mobile terminal 5, the apparatus cancels the disablement of the operation panel 106 before terminating the process. Alternatively, the disabled state of the operation panel 106 may be maintained and an operation from the recognized mobile terminal 5 may be accepted for a prescribed period of time from when the mobile terminal 5 was recognized. For example, when an operating instruction is received again from the mobile terminal 5 within the prescribed period of time, if the timing of reception of the operating instruction coincides with the timing of detection of the vibration of the holding unit 107 by the vibration detecting unit 108, then the image forming apparatus 1 may maintain the disabled state of the operation panel 106 by the panel operation disabling unit 110 and operate on the basis of the operating instruction from the mobile terminal 5. In this case, the control unit 112 may cancel the disablement of the operation panel 106 by the panel operation disabling unit 110 and terminate the process in the case where the reception timing of the operating instruction that has been received from the mobile terminal 5 within the prescribed period of time does not coincide with the timing of detection of the vibration of the holding unit 107, or in the case where no operating instruction is received from the mobile terminal 5 within the prescribed period of time.

Further, in the process described above, the mobile terminal 5 may transmit a start notification including its individual identification number to the image forming apparatus 1. In this case, in the image forming apparatus 1, in the case where the timing of reception of the start notification and the timing of detection of the vibration of the holding unit 107 coincide with each other and the individual identification number of the mobile terminal 5 is included in the start notification, when an operating instruction including the same individual identification number is received afterwards, the image forming apparatus 1 may operate on the basis of the received operating instruction, without determining whether the timing of reception of the operating instruction coincides with the timing of detection of the vibration of the holding unit 107.

Further, the mobile terminal 5 may be provided with a vibration unit, and the vibration unit may cause the mobile terminal 5 to vibrate in a prescribed vibration pattern in the case where an operation on the operating APP 521 is performed. In this case, the vibration detecting unit 108 may detect that the mobile terminal 5 placed on the holding unit 107 has vibrated in the case where it detects the vibration in the prescribed vibration pattern of the holding unit 107.

In the process described above, the operation panel 106 was disabled by software, by the panel operation disabling unit 110. The way of disabling the operation panel 106, however, is not limited thereto.

Figure 5:
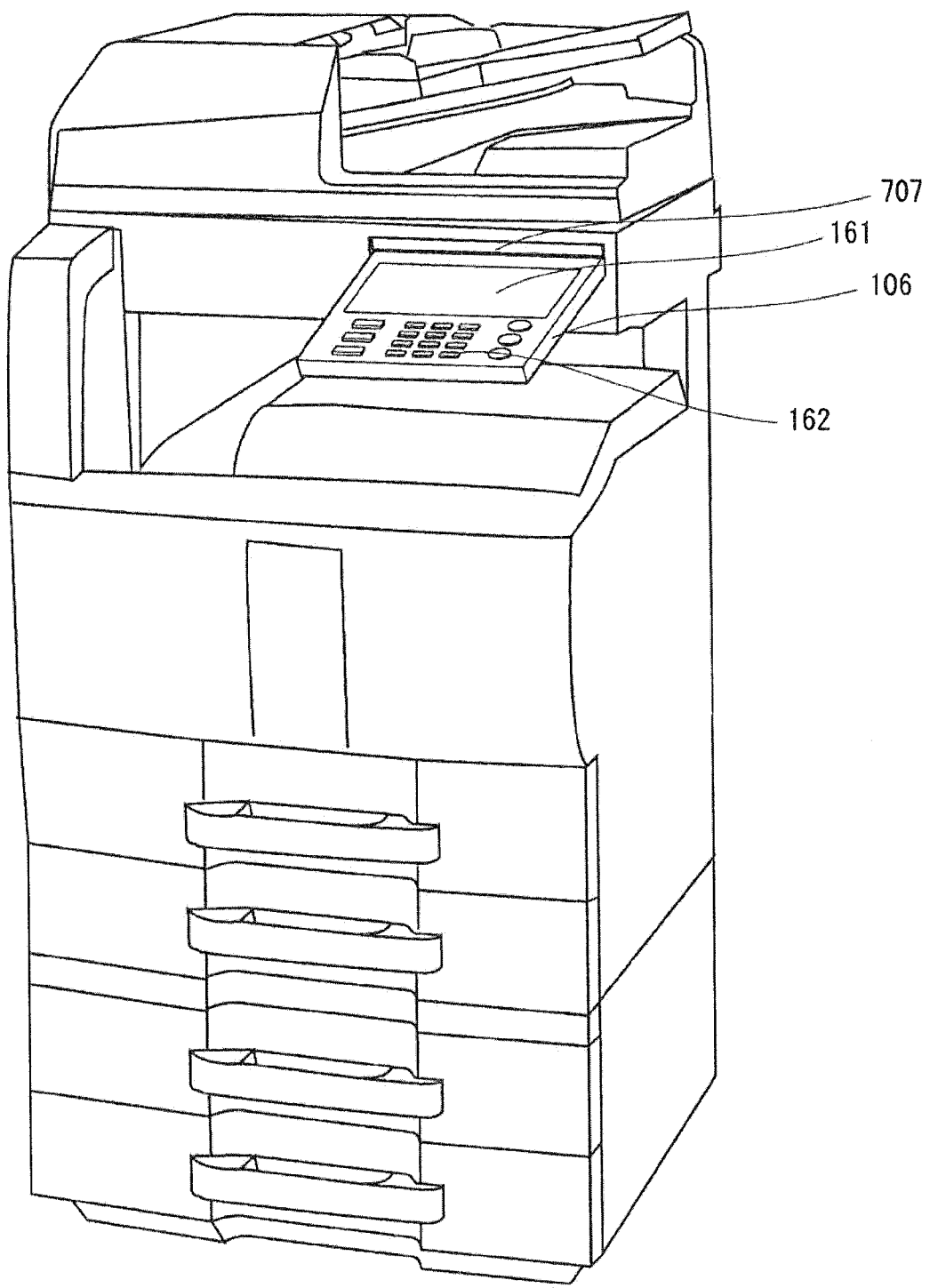
FIG. 5 is a perspective view of an image forming apparatus according to another embodiment.
Figure 6:
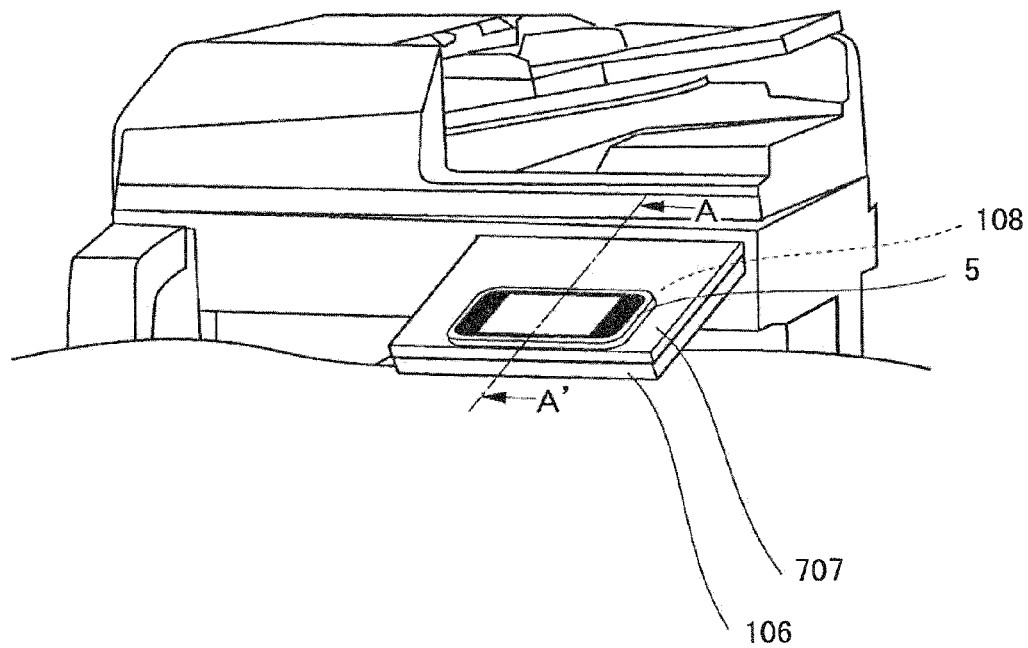
FIG. 6 is a perspective view showing the state where the operation panel shown in FIG. 5 has been covered by the holding unit.
Figure 7:
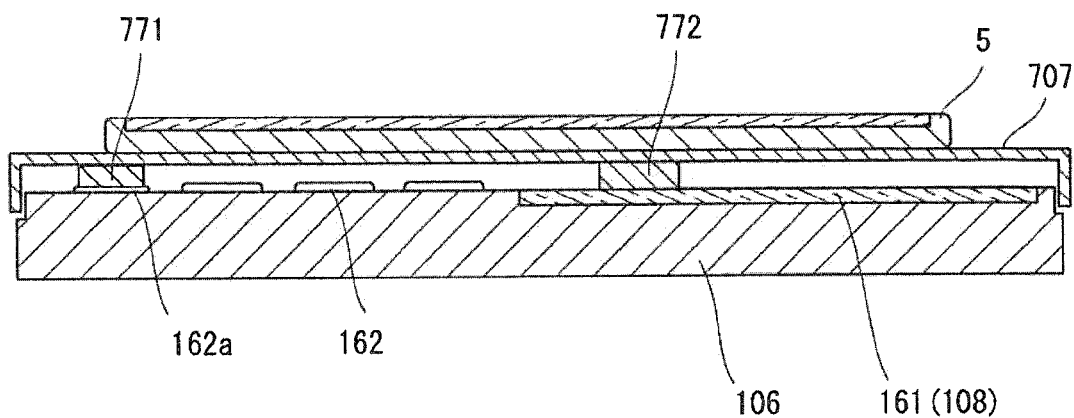
FIG. 7 is a cross-sectional view taken along the line A-A' shown in FIG. 6.

For example, FIGS. 5 and 6 are perspective views of an image forming apparatus 70 having a holding unit 707 which can cover an operation panel 106. FIG. 5 shows the state where the holding unit 707 has been retracted in the image forming apparatus 70. FIG. 6 shows the state where the holding unit 707 has been slid out of the image forming apparatus 70. Except for the holding unit 707, the configuration of the image forming apparatus 70 is identical to that of the image forming apparatus 1, and therefore, the description thereof will not be repeated. As shown in FIG. 5, the holding unit 707 is disposed at a position above the operation panel 106 of the image forming apparatus 70, and it can be retracted into the image forming apparatus 70. When the holding unit 707 is pulled out of the image forming apparatus 70, as shown in FIG. 6, the holding unit 707 comes to cover the operation panel 106. That is, the holding unit 707 serves as a cover member for the operation panel 106. Further, as shown in FIG. 7, on a surface of the holding unit 707 facing the operation panel 106, a first projecting section 771 and a second projecting section 772 are provided in such a manner that, in the state where the holding unit 707 covers the operation panel 106, the first projecting section 771 abuts against and depresses an operation button 162a and the second projecting section 772 abuts against the display unit 161. The operation button 162a against which the first projecting section 771 abuts may be a prescribed operation button 162, or may be a dedicated button.

When a user wishes to operate the image forming apparatus 70 using a mobile terminal 5, the user pulls out the plate-shaped holding unit 707 to cover the operation panel 106, and places the mobile terminal 5 on the holding unit 707 (on the surface of the holding unit opposite to the surface facing the operation panel 106) for operation. In this manner, the operation panel 106 is disabled physically by the holding unit 707.

In the state where the first projecting section 771 abuts against and depresses the operation button 162a (i.e. in the state where the operation panel 106 is covered with the cover member), when the timing of reception of operation information from the mobile terminal 5 coincides with the timing of detection of the vibration of the holding unit 707 caused by the operation of transmitting the operation information, then the terminal recognition unit 109 recognizes the mobile terminal 5 from which the operation information has been received as the mobile terminal 5 from which an operation is to be accepted. The control unit 112 accepts an operation from the mobile terminal 5 recognized by the terminal recognition unit 109. In this case, the vibration of the holding unit 707 may be detected, not by the vibration detecting unit 108, but by the touch panel function of the display unit 161 via the second projecting section 772. With this configuration, the display unit 161 also serves as the vibration detecting unit, eliminating the need to provide the vibration detecting unit 108 in the holding unit 707. In the state where the operation panel 106 is covered with the cover member, the panel operation disabling unit 110 may control the display unit 161 such that it functions solely as the vibration detecting unit.

The number of the first projecting section 771 provided in the holding unit 707 may be more than one. In such a case, two or more first projecting sections 771 are provided so as to abut against prescribed operation buttons 162, respectively. It may be determined that the operation panel 106 is covered with the cover member when it is detected that the prescribed operation buttons 162 have been depressed by the corresponding first projecting sections 771. Further, two or more second projecting sections 772 abutting against the display unit 161 may be provided in the holding unit 707. The second projecting sections 772 may function as the vibration detecting unit.

Figure 8:
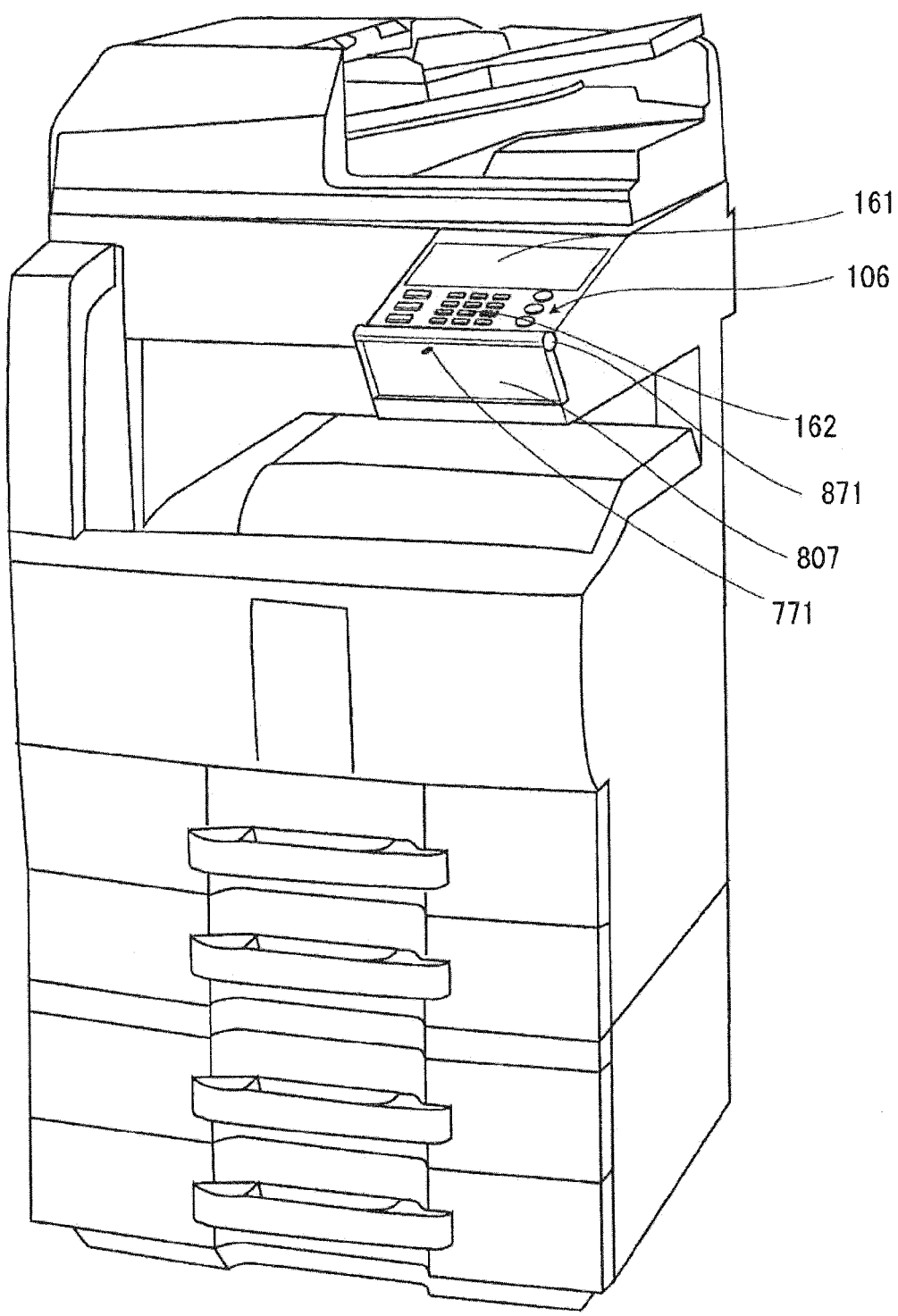
FIG. 8 is a perspective view of an image forming apparatus according to yet another embodiment.
Figure 9:
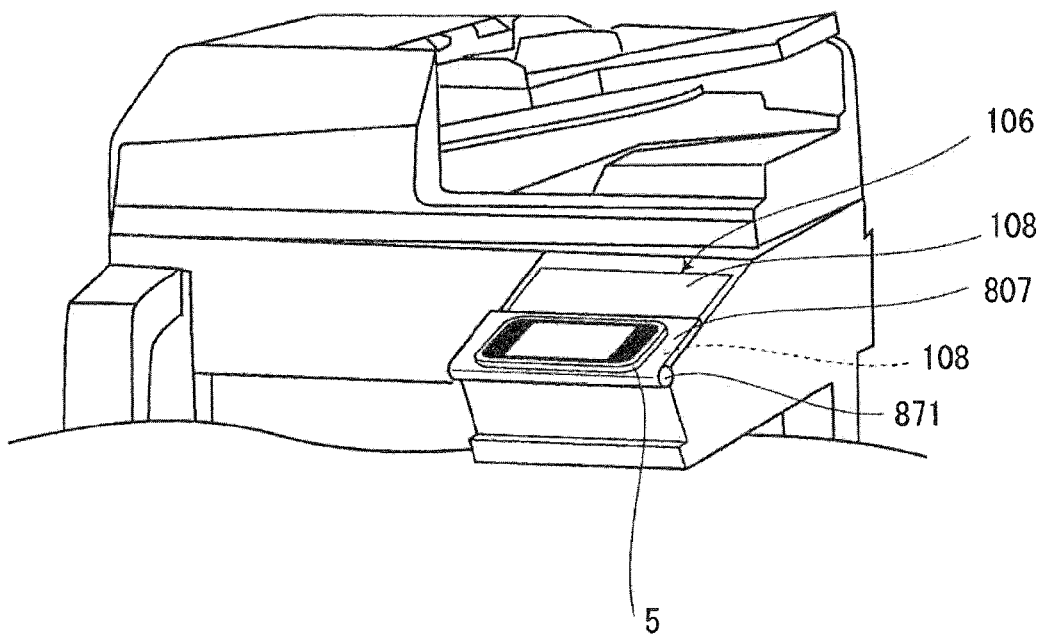
FIG. 9 is a perspective view showing the state where the operation panel shown in FIG. 8 has been covered by the holding unit.

Further, as shown in FIGS. 8 and 9, an image forming apparatus 80 may have a holding unit 807 which can cover operation buttons 162 of an operation panel 106, while leaving a display unit 161 exposed. FIG. 8 shows the state where the operation panel 106 is not covered with the holding unit 807. FIG. 9 shows the state where the operation buttons of the operation panel 106 are covered with the holding unit 807. Except for the holding unit 807, the configuration of the image forming apparatus 80 is identical to that of the image forming apparatus 1, and therefore, the description thereof will not be repeated. The holding unit 807 is configured to be pivotable about a shaft 871 provided at a lower end of the operation panel 106, between a position (in FIG. 8) where the unit 807 does not cover the operation buttons 162 and a position (in FIG. 9) where the unit 807 covers the operation buttons 162. On a surface of the holding unit 807 facing the operation panel 106, a first projecting section 771 is provided which abuts against and depresses a prescribed operation button 162 in the state where the holding unit 807 covers the operation panel 106. According to this configuration, when the prescribed operation button 162 is depressed by the first projecting section 771, information (for example, operation accepting condition, operating condition, or operation guidance) corresponding to an operation from a mobile terminal 5 can be displayed on the display unit 161. In this case as well, the holding unit 807 serves as a cover member for the operation panel 106 and can physically disable the operation buttons 162. In the state where the operation buttons 162 are covered with the cover member, the touch panel function of the display unit 161 is disabled by the panel operation disabling unit 110.

Further, in FIGS. 5 to 9, in the case where the operation buttons 162 are covered with the cover member (i.e. in the case where it is detected that the prescribed operation button 162 has been depressed by the first projecting section 771), the control unit 112 may enable the terminal recognition unit 109 and cause it to perform the processing of recognizing a mobile terminal 5. In the case where the operation buttons 162 are not covered with the cover member (i.e. in the case where it is detected that the prescribed operation button 162 is not depressed by the first projecting section 771), the control unit 112 may disable the terminal recognition unit 109 so as to prevent it from performing the processing of recognizing a mobile terminal 5.

The operation panel 106 shown in FIG. 1 may be provided in such a manner that it can be retracted into the image forming apparatus 1. In this case, the control unit 112 may enable the terminal recognition unit 109 when it detects, by for example a switch such as a push button provided in a housing unit, that the operation panel 106 has been retracted into the image forming apparatus 1. The control unit 112 may disable the terminal recognition unit 109 when it detects that the operation panel 106 has not been retracted in the image forming apparatus 1.

In the present disclosure, the case where the timing of reception of the operation information by the communication unit coincides with the timing of detection of the vibration by the vibration detecting unit refers to the case where the communication unit has received the operation information from the mobile terminal within a predetermined period of time from when the vibration detecting unit detected the vibration. The case where the timing of reception of the operation information by the communication unit coincides with the timing of detection of the vibration by the vibration detecting unit also includes the case where the vibration detecting unit has detected the vibration within a predetermined period of time from when the communication unit received the operation information from the mobile terminal.

What is claimed is:

1. An image forming apparatus having an operation panel and being operable from the operation panel and a mobile terminal, the image forming apparatus comprising:
   a holding unit that holds the mobile terminal;
   a vibration detecting unit that detects a vibration of the mobile terminal held by the holding unit;
   a communication unit that receives operation information wirelessly from the mobile terminal; and
   a terminal recognition unit that recognizes the mobile terminal from which an operation is to be accepted, on the condition that the timing of reception of the operation information by the communication unit coincides with the timing of detection of the vibration by the vibration detecting unit; wherein
   the image forming apparatus disables acceptance of an operation from the operation panel in the case of accepting an operation from the mobile terminal.

2. The image forming apparatus according to claim 1, further comprising a panel operation disabling unit that disables, by software, the acceptance of the operation from the operation panel in the case where the mobile terminal has been recognized by the terminal recognition unit.

3. The image forming apparatus according to claim 1, wherein
   the holding unit is provided in such a way as to be movable between a first position and a second position, the holding unit in the first position covering the operation panel, the holding unit in the second position leaving the operation panel exposed,
   a first projecting section is provided on a surface of the holding unit facing the operation panel, the first projecting section being configured to depress a prescribed operation button included in the operation panel when the holding unit has moved to the first position, and
   the terminal recognition unit is enabled in the case where the prescribed operation button is depressed, and the terminal recognition unit is disabled in the case where the prescribed operation button is not depressed.

4. The image forming apparatus according to claim 3, wherein
   the operation panel has a display unit and operation buttons,
   the holding unit is provided in such a way as to be pivotable between the first position and the second position, the holding unit in the first position covering the operation buttons while leaving the display unit exposed, the holding unit in the second position leaving the display unit and the operation buttons both exposed, and in the case where the prescribed operation button has been depressed, the display unit displays information corresponding to an operation from the mobile terminal.

5. The image forming apparatus according to claim 1, wherein
the holding unit is provided in such a way as to be slidable between a first position and a second position, the holding unit in the first position covering the operation panel, the holding unit in the second position leaving the operation panel exposed,
a second projecting section is provided on a surface of the holding unit facing the operation panel, the second projecting section being configured to abut against a touch panel provided on the operation panel when the holding unit has moved to the first position, and
the vibration detecting unit is the touch panel.

6. The image forming apparatus according to claim 1, wherein
the operation panel is configured to be able to be retracted into the apparatus,
the image forming apparatus further comprises a retraction detecting unit that detects whether the operation panel has been retracted, and
the terminal recognition unit is enabled in the case where the operation panel has been retracted, and the terminal recognition unit is disabled in the case where the operation panel has not been retracted.

7. The image forming apparatus according to claim 1, wherein the vibration detecting unit detects the vibration of the mobile terminal via the holding unit.

* * * * *